United States Patent [19]

Akamatu et al.

[11] Patent Number: 5,096,116
[45] Date of Patent: Mar. 17, 1992

[54] METHOD AND APPARATUS FOR CONTROLLING HEATING OUTPUT OF COOKING PAN

[75] Inventors: Yosio Akamatu, Nara; Mitsuo Yokohata, Habikino; Fumiko Hashimoto, Nara, all of Japan

[73] Assignee: Matsushita Electric Industrial Co., Ltd., Osaka, Japan

[21] Appl. No.: 651,613

[22] Filed: Feb. 6, 1991

[30] Foreign Application Priority Data

Feb. 9, 1990 [JP] Japan .................................. 2-30862

[51] Int. Cl.⁵ .......................... F23N 1/08; F24C 3/00
[52] U.S. Cl. .................................. 236/20 A; 99/331; 126/39 G
[58] Field of Search ........... 236/20 A; 99/331, 329 R; 126/39 G; 219/449, 494

[56] References Cited

U.S. PATENT DOCUMENTS

| | | | |
|---|---|---|---|
| 4,492,336 | 1/1985 | Takata et al. | 236/20 A |
| 4,682,012 | 7/1987 | Wolf et al. | 219/490 |
| 4,745,262 | 5/1988 | Larsen | 219/492 |
| 4,839,503 | 6/1989 | Wolf et al. | 99/329 R |
| 4,962,299 | 10/1990 | Duborper et al. | 219/492 |

FOREIGN PATENT DOCUMENTS

| | | |
|---|---|---|
| 0074108A3 | 3/1983 | European Pat. Off. |
| 0348298A | 12/1989 | European Pat. Off. |
| 2112966A | 7/1983 | United Kingdom |

*Primary Examiner*—William E. Wayner
*Attorney, Agent, or Firm*—Wenderoth, Lind & Ponack

[57] ABSTRACT

As the temperature of a cooking pan is measured by a temperature detector, a moisture detecting means decides whether a material to be cooked is to be boiled, sauteed or fried. In the case of the material to be boiled, a scorching preventing device works to prevent scorching of the material. In the case of the material to be sauteed or fried, an overheating preventing device prevents overheating of the material. For this end, the temperature detector, detecting how the temperature of the cooking pan increases, controls a heating device via a heating controller. Accordingly, the material can be cooked safely irrespective of the cooking fashion if only a force adjusting knob and an ignition/extinction button are manipulated.

16 Claims, 10 Drawing Sheets

METHOD AND APPARATUS FOR CONTROLLING HEATING OUTPUT OF COOKING PAN

BACKGROUND OF THE INVENTION

1. Field of the Invention

The present invention relates to a method and apparatus for controlling the heating output of a cooking pan with an aim to realize safe cooking, whereby the type of cooking of the material to be cooked in said pan for instance, boiling or frying, is automatically detected thereby preventing scorching of said material if it is boiling or an oil fire if it is frying.

2. Description of Prior Art

A conventional cooking apparatus of the type referred to above will be discussed hereinbelow with reference to FIGS. 10-12.

Figure 10:
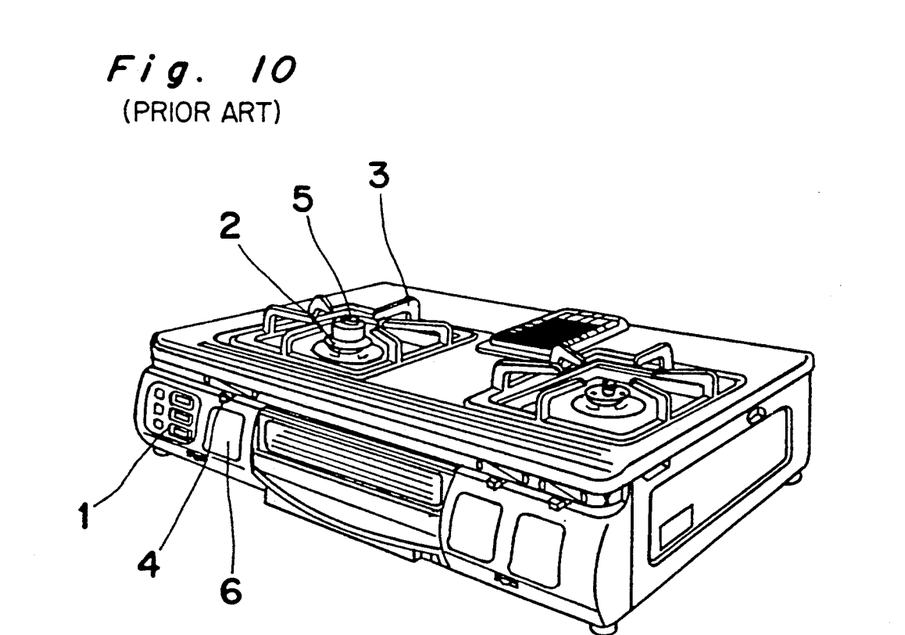
FIG. 10 is a perspective view of a conventional range with an overheating preventing arrangement.
Figure 11:
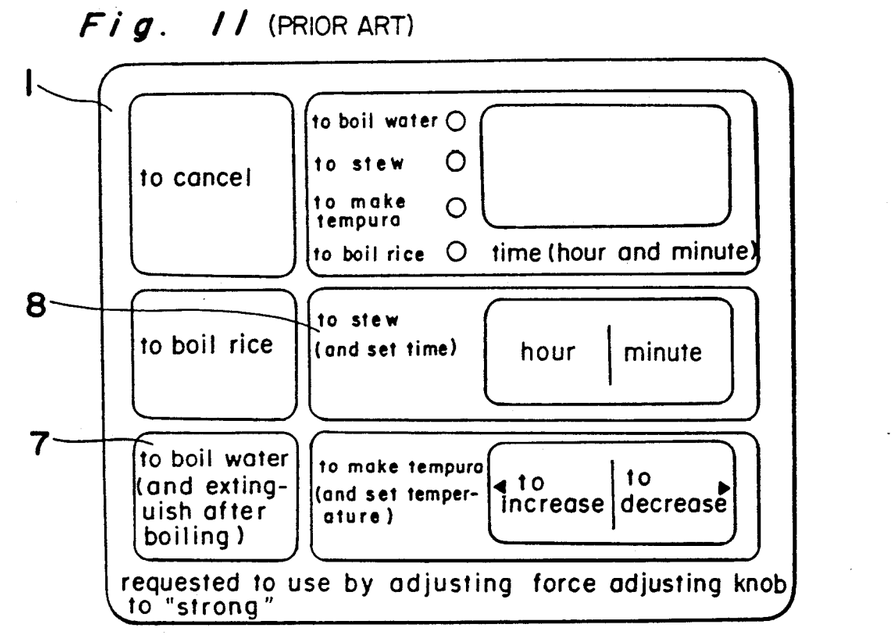
FIG. 11 is a diagram explanatory of a conventional operating panel used in selecting a menu.
Figure 12:
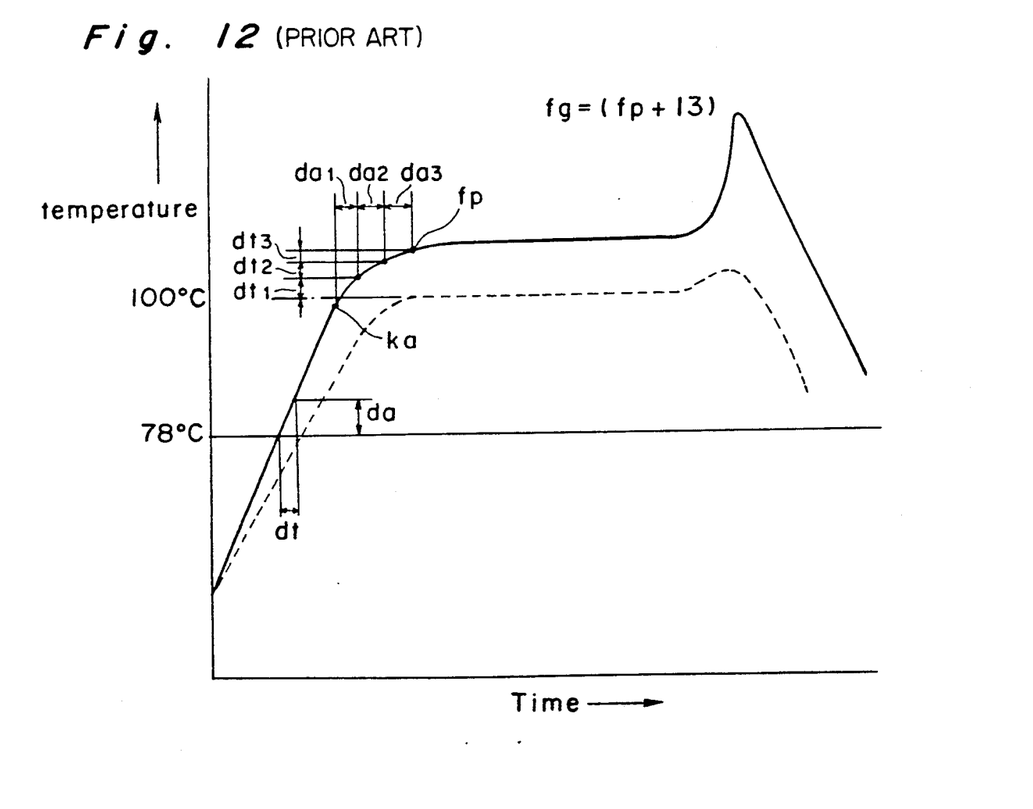
FIG. 12 is a graph showing how to detect boiling of the material to be cooked in a conventional manner.

FIG. 10 is a perspective view seen from the front face of a conventional gas range and FIG. 11 is an enlarged front view of an operating panel 1 of the gas range.

Conventional Example 1

As indicated in FIG. 10, the conventional gas range is constituted of the operating panel 1, a burner 2, a fire-iron crest 3, an adjusting knob 4 for adjusting the force or strength of the gas, an ignition/extinction button 6, etc. In cooking, a user selects a key corresponding to an intending menu from the cooking menus indicated on the operating panel 1 (FIG. 11) and depresses the ignition button 6. It is inconvenient, however, when the intending menu does not agree with the cooking mode indicated on the cooking panel 1. Moreover, although an overheating preventing arrangement (for automatically extinguishes the range at 250° C. to thereby avoid an oil fire) is automatically actuated, a scorching preventing device does not automatically operate, so that the aged or inexperienced people find it hard to use the gas range. As a result, the gas range of this type is scarcely used.

Conventional Example 2

The conventional gas range is provided with a highly accurate detecting means. The detecting means is to correctly achieve the intending menu of the material containing moisture through a water-boiling key 7 (for automatically extinguishing the range when water boils) and a boiling or stewing key 8 (for actuating an automatic extinction timer set beforehand to be actuated after the material boils, and simultaneously, automatically switching the force of the gas to be weak, etc.). These keys 7 and 8 are installed on the operating panel 1 of FIG. 11. A graph of FIG. 12 explains one example how to detect boiling of the material in a conventional manner. That is, a temperature rise (da) per a unit of time (dt) is obtained since a sensor which detects the temperature at the bottom of a cooking pan detects 78° C., and it is assumed from an inclination of the temperature rise (size of (da)) whether the material contains a large or a small quantity of moisture. Then, an expecting boiling point (ka) is assumed according to the inclination of the temperature rise. A boiling point (fp) is finally detected based on the temperature rise (da1, da2, for every unit of time passing after the sensor detects the expecting boiling point (ka) and a predetermined comparison value set for every quantity of moisture to each temperature rise (da1, da2, ... ). Since boiling of the material has been detected along a very complicated program as described above, it requires a microcomputer to cover a wide range of areas. Therefore, in the case where several burners are controlled by a single microcomputer, it is difficult to apply the conventional detecting method for all of the burners in terms of the capacity of the elements of the microcomputer. Moreover, it is disadvantageous that it has been prohibited in order to improve the boiling accuracy to stir or add water after the sensor detects 78° C. before boiling of the material is detected.

Conventional Example 3

In the conventional gas range, it is set as a scorching temperature (fg) when the sensor 5 detects the temperature rise of 13 deg from the boiling point, so that the gas range is automatically turned off at the scorching temperature. However, the temperature rise differs depending on the material and thermal conductivity of the pan, or whether or not the material contains a great amount of moisture. Therefore, if it is presumed that all kinds of cooking materials reach the scorching temperature (fg) by the same temperature rise (13 deg), the material containing less moisture is undesirably liable to be scorched. On the other hand, if the temperature rise for deciding the scorching temperature is set much smaller than 13 deg, the scorching preventing device is actuated too earlier. It is accordingly impossible to set the temperature rise not larger than 13 deg.

Conventional Example 4

The conventional overheating preventing device is designed to be turned on when the sensor 5 detects 250° C. or so. Therefore, the cooking range is automatically and unexpectedly extinguished at 250° C. without an input through the operating panel 1.

Conventional Example 5

In a series of cooking, for example, in curry, vegetables are sauteed first and water or the like is added thereto and boiled. In this case, the temperature is raised when the vegetables are sauteed, whereas, the vegetables are scorched at a temperature lower than that after the water or the like is added. Therefore, although it is necessary in such menu as curry to automatically switch the overheating preventing arrangement and scorching preventing arrangement in a series of cooking, the conventional gas range cannot do the job, rather requiring an input through the operating panel 1 after the water is added to the sauteed vegetables.

As discussed hereinabove, the conventional gas range is not easy to handle. A burner of the range occupies a wide area of the microcomputer, and therefore many burners cannot be operated by a single microcomputer.

SUMMARY OF THE INVENTION

The present invention has been devised to solve the above-described disadvantages and has for its essential object to provide a cooking apparatus with the following functions;

(1) To detect the type of the material to be cooked, so that the material to be boiled is prevented from being scorched and the material to be sauteed or fried is prevented from being overheated.

(2) To either generate an alarm or control the heating amount when the material to be boiled reaches a scorching temperature, so that the material to be boiled is prevented from being scorched.

(3) To continue heating if the material to be boiled becomes lower than the scorching temperature as a result of "stirring" or the "addition of the other materials" within a predetermined time after the material to be boiled reaches the scorching temperature or to stop heating if the material to be boiled does not become lower than the scorching temperature in spite of the "stirring" or the "addition" within the predetermined time.

(4) To control the heating amount to restrict the temperature rise when the material to be sauteed or fried comes near the overheating temperature or to stop heating if the material to be sauteed or fried still exceeds the overheating temperature.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF A PREFERRED EMBODIMENT

Figure 1:
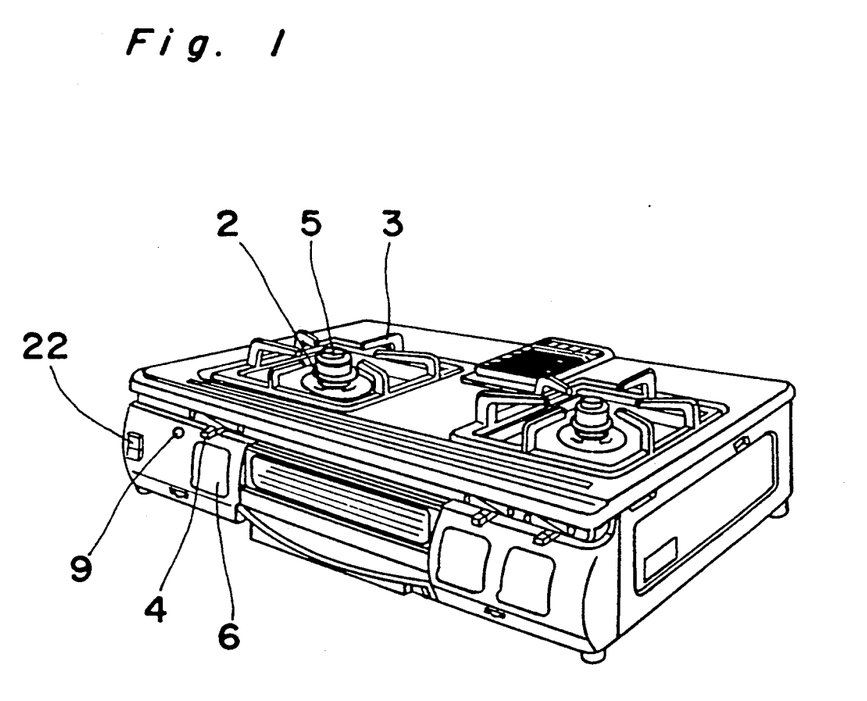
FIG. 1 is a perspective view of a cooking apparatus according to one preferred embodiment of the present invention.
Figure 2:
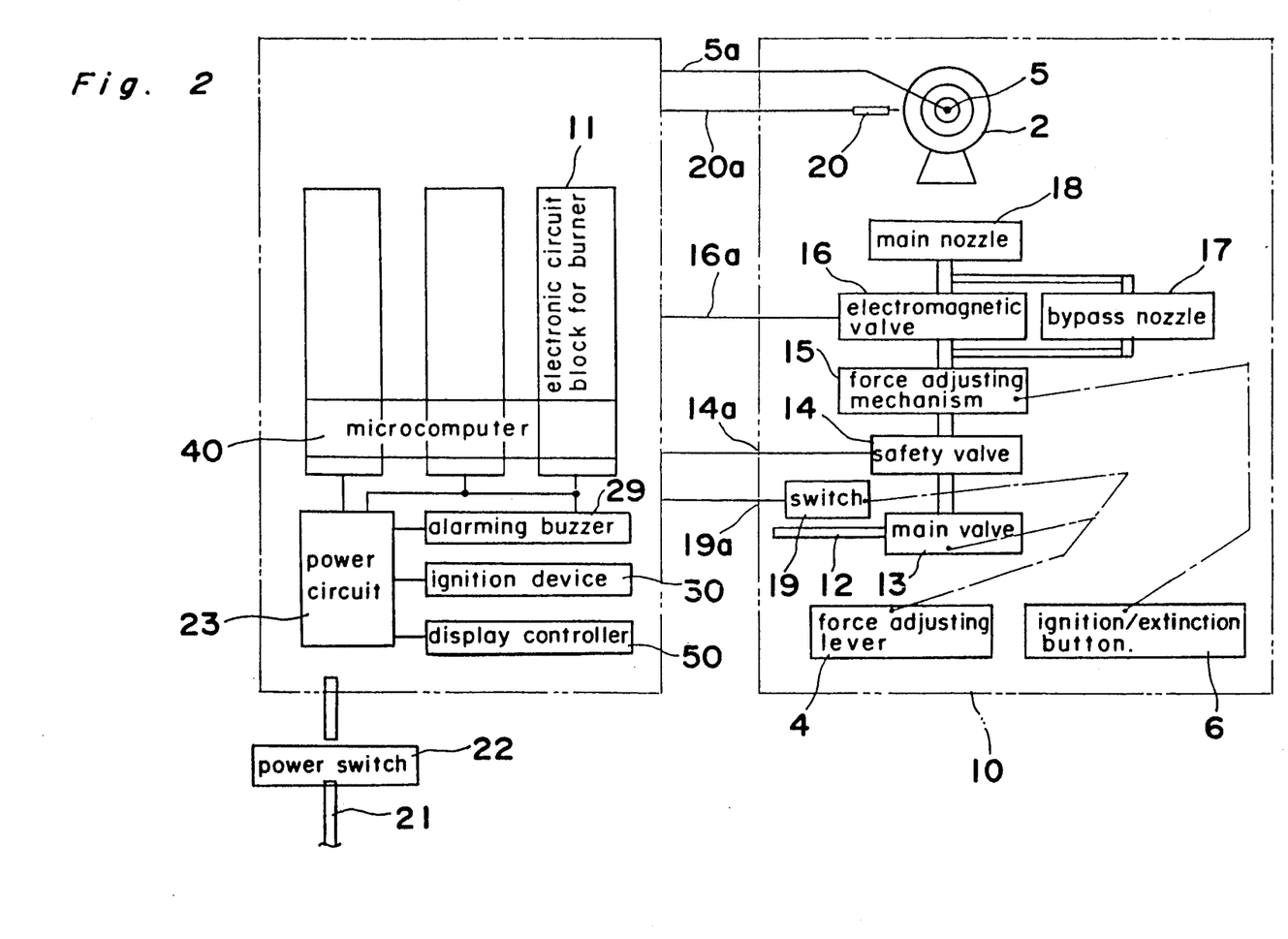
FIG. 2 is a block diagram of a heating means and an electronic circuit of the apparatus of FIG. 1.

A preferred embodiment of the present invention will be described hereinbelow with reference to the accompanying drawings. It is to be noted that those components having the same function as the conventional ones are designated by the same reference numerals and the description thereof will be abbreviated here. FIG. 1 is a perspective view of a gas cooking apparatus, seen from the front face thereof, according to one preferred embodiment of the present invention, and FIG. 2 is a block diagram schematically showing the structure of a controlling line of gas and an electronic circuit including a microcomputer. FIGS. 3-6 illustrate the constitution of each detecting means mainly centering on a microcomputer incorporated therein.

Referring to FIG. 1, what requires manual manipulation in the gas cooking apparatus of the present invention is only an ignition/extinction button 6 and an adjusting knob 4 for adjusting the force of the gas.

The gas cooking apparatus consists of a plurality of burners, each burner substantially comprised of a heating means 10 and an electronic circuit block 11 as illustrated in the block diagram of FIG. 2.

The heating means 10 is formed at least of a gas conduit 12, the ignition/extinction button 6, the gas adjusting lever 4, a main valve 13 which mechanically feeds or stops the gas following the manipulation of the ignition button 6, a safety valve 14 which feeds or shuts the gas through electronic control, a lead wire 14a of the safety valve 14, an adjusting mechanism 15 which is manually operated to adjust the force of the gas through the adjusting lever 4, an electromagnetic valve 16 used in setting the minimum flow rate of the gas through electronic control, a lead wire 16a of the electromagnetic valve 16, a bypass nozzle 17 used in setting the minimum flow rate of the gas when the electromagnetic valve 16 is closed, a main nozzle 18 to set the maximum flow rate of the gas, a switch 19 interlocked with the ignition button 6, a lead wire 19a of the switch, a burner 2, a sensor 5 for detecting the temperature at the bottom of a pan, an ignition electrode 20 and a lead wire 20a of the ignition electrode 20.

The electronic circuit block 11 is connected to a power circuit 23 through a power switch 22 from a power cord 21 100 V AC, for example, so that power is fed to each electronic circuit block from the power circuit 23. The number of electronic circuit blocks necessary corresponds to the number of burners, and is substantially comprised of a heating controlling means 24, a temperature detecting means 25, a moisture detecting means 26, a scorching preventing means 27, an overheating preventing means 28, an ignition device 30, an alarming buzzer 29, and an alarming lamp 9.

In the structure of the gas cooking apparatus as above, when the ignition button 6 is depressed as the electronic circuit is connected to the power source and the power switch 22 is turned on, the switch 19 is brought into the ON state, whereby the safety valve 14 and electromagnetic valve 16 controlled by the heating controlling means 24 are opened subsequent to the supply of the power. The gas is sent to the burner 2 from the gas conduit 12, main valve 13, safety valve 14, force adjusting mechanism 15, passing through the electromagnetic valve 16 and bypass nozzle 17, to the main nozzle 18. The gas at the burner 2 ignites when the ignition electrode sparks due to a high voltage supplied from the ignition device 30 which is driven for a limited period of time since the switch 19 is turned on.

Generally, in the early stage of ignition, the temperature of the material to be cooked is close to the room temperature and therefore, the temperature sensor 5 indicates a temperature close to the room temperature. The safety valve 14 and electromagnetic valve 16 are in the opened state. The heat generating amount can be controlled at the user's desired value by manipulating the force adjusting mechanism 15 through the adjusting lever 4. Moreover, the heat generating amount when the force adjusting mechanism 15 is controlled at the minimum level is set beforehand to be approximately equal to the minimum flow rate of the gas flowing out of the bypass nozzle 17 while the electromagnetic valve 16 is in the OFF state. Accordingly, the electromagnetic valve 16 can be replaced by adjusting the adjusting lever 4 manually to the minimum level. The burner is extinguished by means of the ignition/extinction button 6 or by stopping the power supply to the safety valve 14.

While the temperature of the material to be cooked is increased as the burner continues burning, the resistance of the temperature sensor 5 having a thermistor as a temperature detecting element changes as well. The change of the resistance is input to the electronic circuit block 11 via the lead wire 5a. In the electronic circuit block 11, the input resistance value changing along with the temperature change of the sensor 5 is added to or subtracted from a predetermined coefficient, and turned into a temperature value by the temperature detecting means 25.

Figure 3:
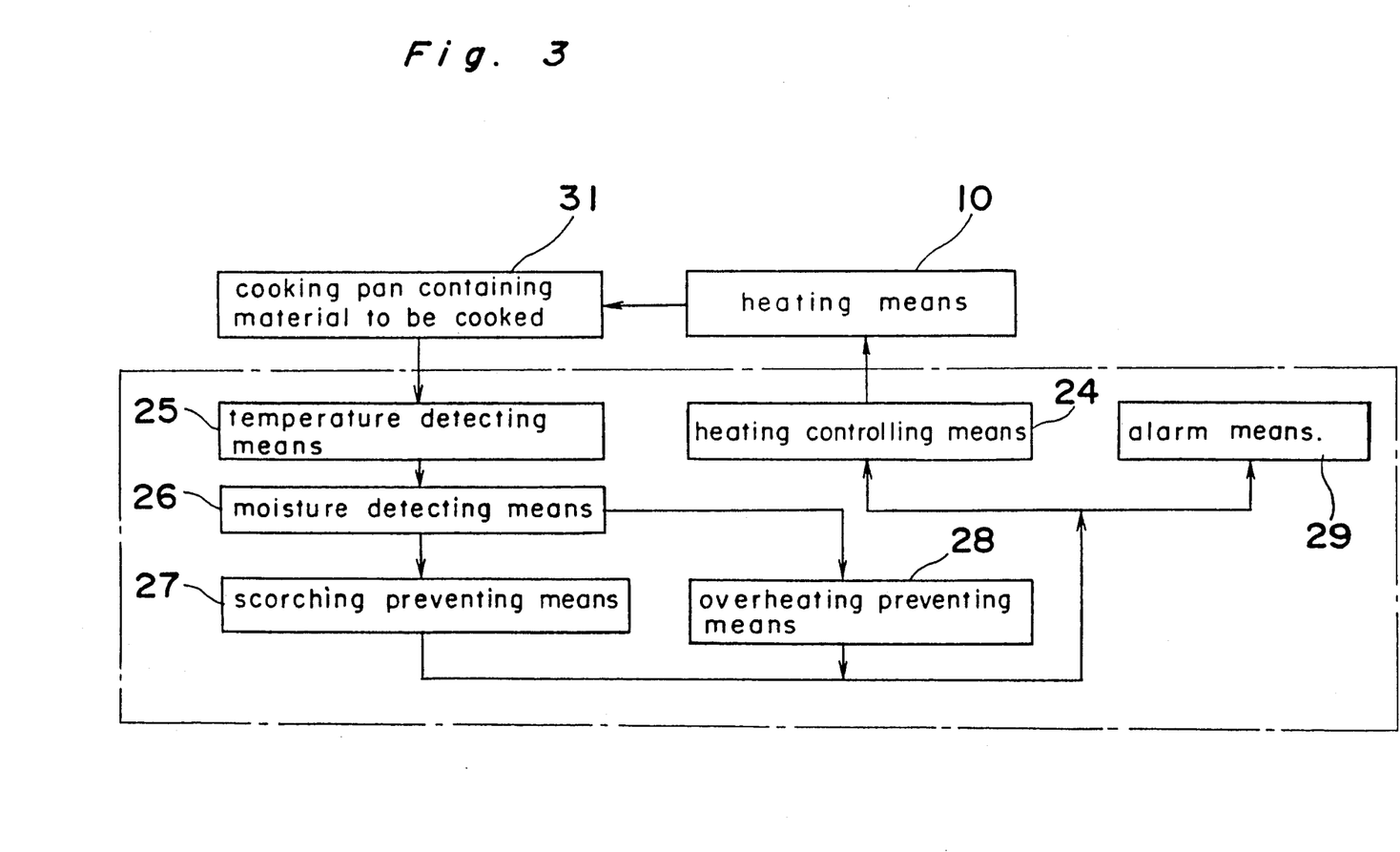
FIG. 3 is a block diagram showing the basic structure of various detecting means.

FIG. 3 is a block diagram showing the basic structure of various kinds of detecting means of the gas cooking apparatus. The temperature detecting means 25 detects the heating state of the pan containing the material to be cooked by the heating means 10 controlled by the heating controlling means 24. The moisture detecting means 26 detects whether the material to be cooked is an object to be boiled, fried or sauteed. In the case of the material to be boiled, the scorching preventing means 27 is actuated to monitor the material and generate a controlling signal both to the heating controlling means 24 and to the alarm means 29 when the material reaches the scorching temperature. On the other hand, in the case of the material to be fried or sauteed, the overheating preventing means 28 starts to monitor if the material is overheated. A controlling signal is sent out from the overheating preventing means 28 to the heating controlling means 24 and alarm means 29 when the material reaches the overheating temperature.

Figure 4:
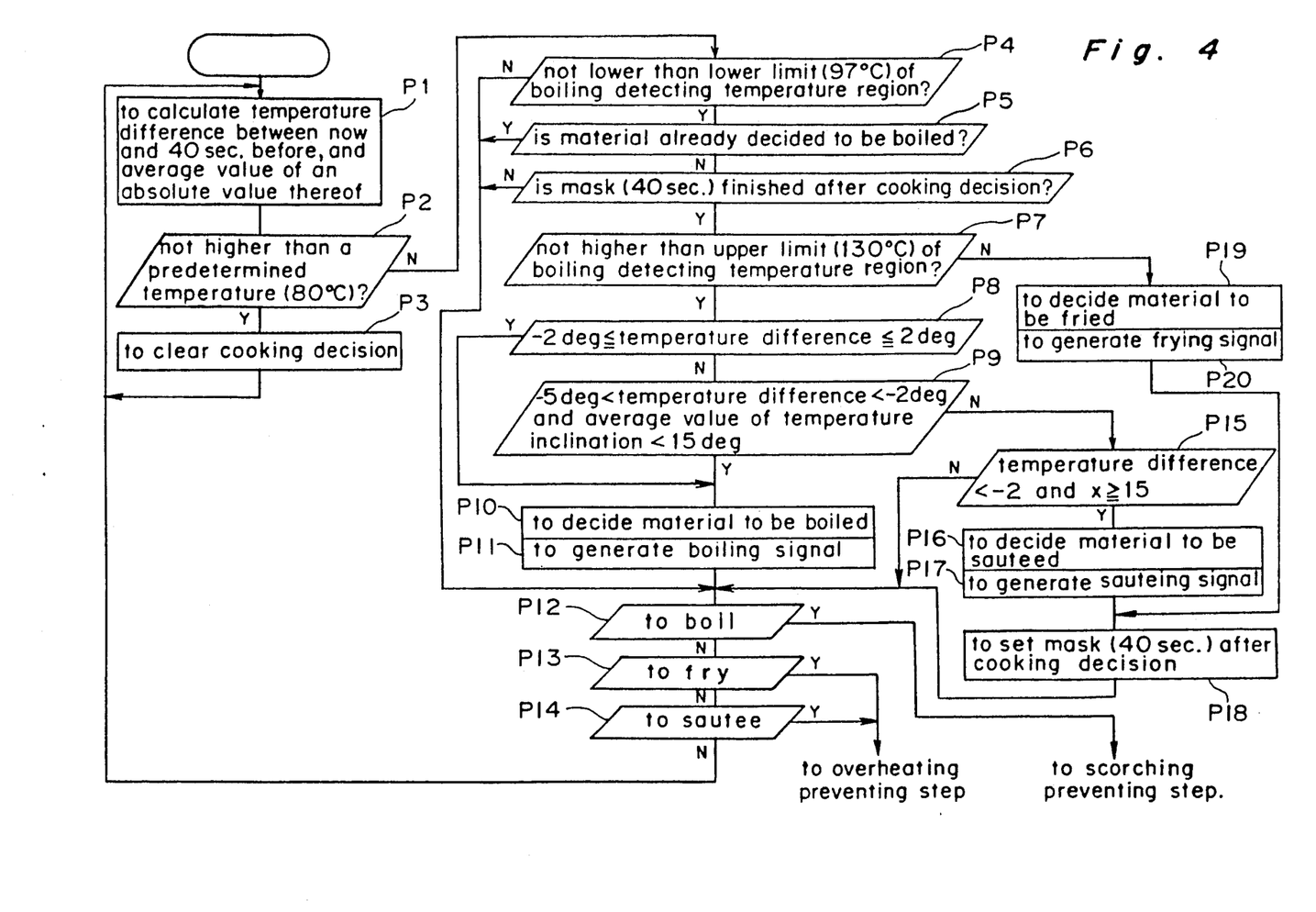
FIG. 4 is a flowchart showing the operation of a moisture detecting means.

FIG. 4 explains the operation of the moisture detecting means 26. The temperature detected by the temperature detecting means 25 (hereinafter referred to as a detecting temperature) is input to the moisture detecting means 26 each preset time period, so that the difference between the detecting temperature and the temperature a predetermined time before (e.g., 40 seconds) is obtained. The average of an absolute value of an inclination of the earlier-mentioned temperature rise (hereinafter referred to as an average value of the temperature inclination) is also calculated (P1). It is detected whether the material is not lower than a predetermined temperature (e.g., 80° C.) (P2). If the temperature is equal to or lower than 80° C., the decision of the material to be cooked is cleared (P3) and the process returns to P1. If the temperature is higher than the predetermined temperature, it is detected whether the detecting temperature is not smaller than the lower limit (e.g., 97° C.) of the temperature region where boiling is detected (P4). The process skips to P12 if the detecting temperature is lower than the lower limit (e.g., lower than 97° C.). On the contrary, if the detecting temperature is not higher than the lower limit, it is detected whether the material to be cooked is already decided to be boiled (P5). When the material to be cooked is already decided to be boiled, the process goes to P12. When the material to be cooked is not yet decided to be boiled, the process goes to P6, where it is judged whether a mask (e.g., 40 seconds) is finished after the material is decided. Then, the process proceeds to P12 if the mask is not finished or to P7 if the mask is finished. When it is detected whether the detecting temperature is not higher than the upper limit (e.g., 130° C.) of the boiling detecting temperature region (P7), and if the detecting temperature is higher than the upper limit, the process proceeds to P19, whereas, if the detecting temperature is not higher than the upper limit, the process goes to P8. It is detected whether the aforementioned temperature inclination is within a certain range (e.g., +2 degrees) (P8). The material to be cooked is decided to be boiled when the condition meets (P10), with a boiling signal generated (P11). In the event the condition that the temperature inclination is within −5 degrees to −2 degrees, and the average value of the temperature inclination is smaller than 15 degrees is satisfied, the process moves from P9 to P10. If the condition is not satisfied, the process goes to P15 from P9.

When the condition that the temperature inclination is not larger than 2 degrees and the average value of the temperature inclination is not smaller than 15 degrees is not held, the process moves from P15 to P12. On the other hand, when the above condition is met, the process moves from P15 to P16, where the material to be cooked is determined to be sauteed. Subsequently, a sauteing signal is generated (P17) and a mask is set (P18). The process goes to P12 thereafter.

In the meantime, if the detecting temperature is higher than the upper limit of the boiling detecting temperature region (P7), the process goes to P19, where the material to be cooked is decided to be fried. At this time, a frying signal is generated (P20) and a mask is set (P18), and then the process goes to P12.

Figure 5:
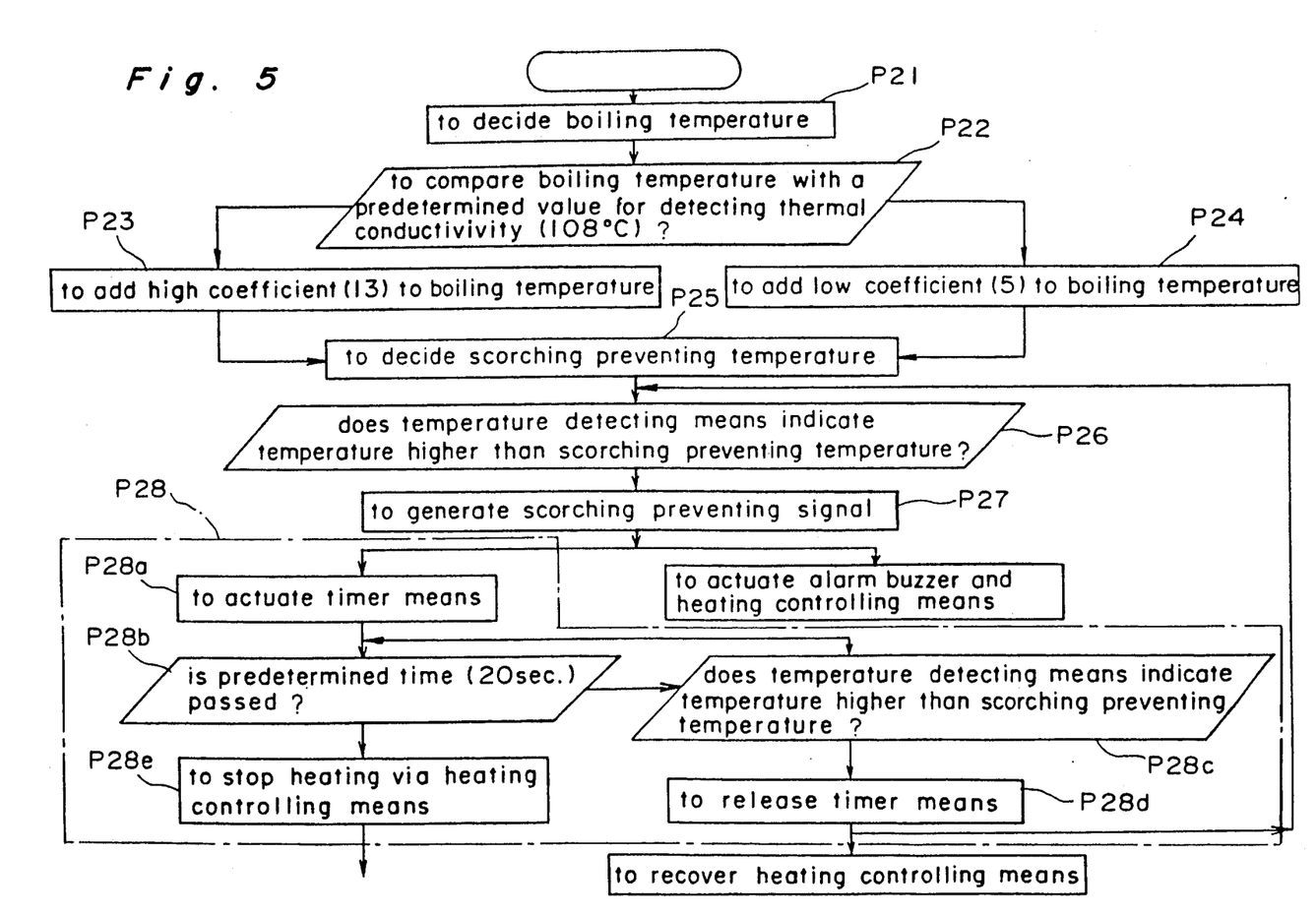
FIG. 5 is a flowchart showing the operation of a scorching preventing means.
Figure 6:
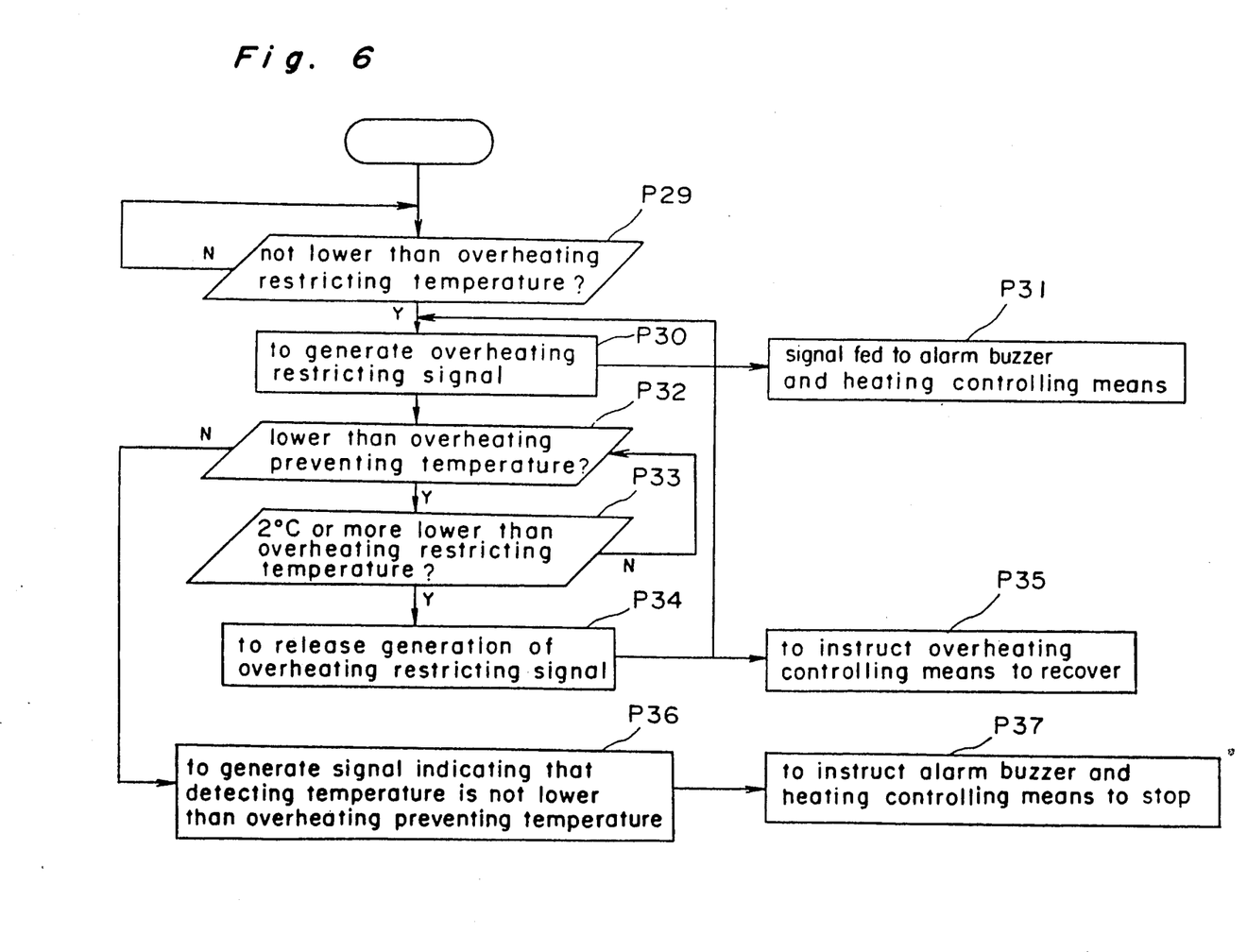
FIG. 6 is a flowchart showing the operation of a heating controlling means.

It is detected in P12 whether the material to be cooked is already decided to be boiled. If the material to be cooked is already decided so, a decision for preventing scorching of the material is started (FIG. 5). If not, it is detected in P13 whether the material to be cooked is already decided to be fried. If the material to be cooked is already decided to be fried, a decision for prevention of overheating is made (FIG. 6). On the other hand, if the material to be cooked is not to an object to be fried, it is judged in P14 whether the material to be cooked is already decided to be sauteed. In the case where the material to be cooked is already decided to be sauteed, the process proceeds to P14, similar to the case of the material to be fried, starting the overheating preventing decision. If the material to be cooked is not to be sauteed, the process returns to P1.

FIG. 5 illustrates the operation of the scorching preventing means 27. The aforementioned detecting temperature measured when the moisture detecting means 26 detects that the material to be cooked is to be boiled is set as a boiling temperature (P21). The boiling temperature is compared with a predetermined temperature (e.g., 108° C.) to detect the heat conduction of the material (P22). When the condition is satisfied (that is, the boiling temperature is lower than 108° C.), a predetermined high coefficient (e.g., 13 degrees) is added to the boiling temperature (P23). If the condition is not satisfied (i.e., the boiling temperature is higher than 108° C.), a predetermined low coefficient (e.g., 5 degrees) is added to the boiling temperature (P24). The obtained value is set as a scorching preventing temperature (P25), and then it is detected whether the detecting temperature is higher than the scorching preventing temperature (P26). A controlling signal to prevent scorching is output to the detecting means at the succeeding stage, alarming buzzer 29 and heating controlling means 24 only when the detecting temperature is higher than the scorching preventing temperature (P27). In a timer means P28 installed within the overheating preventing means 28, the time passing after the controlling signal to prevent scorching is generated is counted (P28a), and whether a predetermined time (e.g., 20 seconds) has passed since then is detected (P28b). Thereafter, it is detected whether the heat generating amount is reduced in the predetermined time by the heating controlling means 24 or whether the detecting temperature becomes not higher than the scorching preventing temperature in the predetermined time subsequent to "stirring" of the material or the "addition of the other materials to be cooked" (P28c). When the condition is held (i.e., the detecting temperature becomes lower than the scorching preventing temperature), the timer means is released (P28d), with the heating controlling means being returned to work, so that the process proceeds to P26. When the detecting temperature is not lower than the scorching preventing temperature in the above predetermined time, the heating controlling means 24 is driven to stop heating (P28e).

The operation of the heating controlling means 24 will be explained with reference to FIG. 6. It is detected whether the detecting temperature is higher than an overheating restricting temperature (P29). If the detecting temperature is higher than the restricting temperature, an overheating restricting signal is generated (P30), and at the same time, an instruction to reduce the heating amount is generated and fed to the alarm buzzer 29 and heating controlling means 24 (P31). It is detected (P32) after the detecting temperature exceeds the overheating restricting temperature whether the former is lower than an overheating preventing temperature. Then, it is detected (P33) when the condition is met whether the detecting temperature is lower than a temperature obtained by subtracting a predetermined temperature (e.g., 2° C.) from the overheating restricting temperature. If the detecting temperature is lower than the above-obtained temperature, generation of the overheating restricting signal is stopped (P34) and an instruction to recover the heating amount is generated to the heating controlling means 24 (P35). The process returns to P30. On the other hand, if the detecting temperature is higher than the overheating preventing temperature (P32), a signal indicating that the detecting temperature is not lower than the overheating preventing temperature is generated (P36) and an instruction to stop heating is output to the alarming buzzer 29 and heating controlling means 24.

In the basic structure of the gas cooking apparatus of the present invention-as shown in FIG. 3, it becomes unnecessary to select a menu from the cooking menus on the operating panel 1. In consequence, the gas cooking apparatus can be used easily in the same manner as an ordinary range without a safety function, ensuring ready access thereto even for the aged or inexperienced people.

Figure 7:
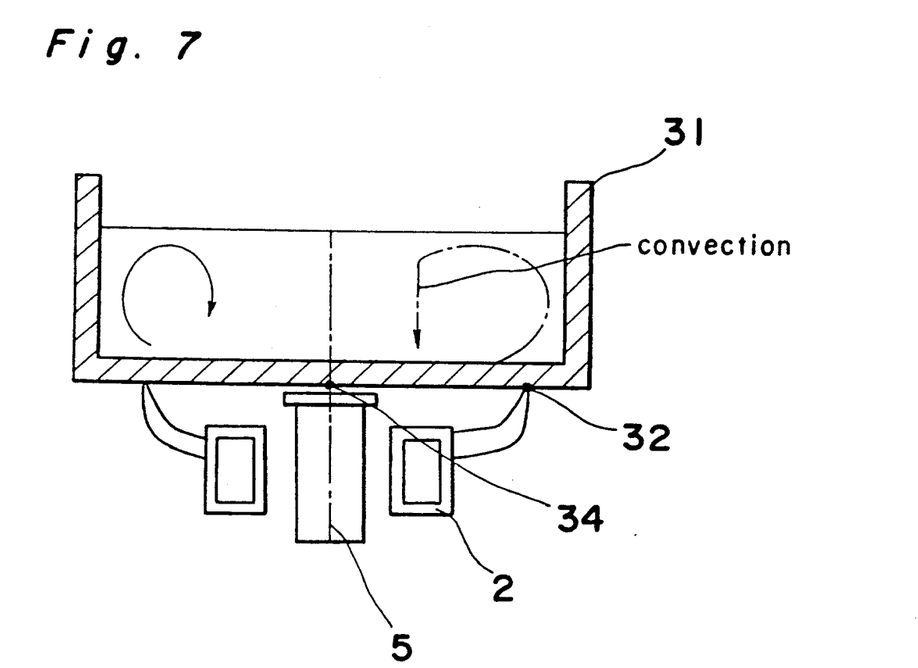
FIG. 7 is a cross sectional view of a pan showing the place where the temperature at the bottom of the pan is measured.

As shown in FIG. 7, as a heating point 32 at the bottom of a pan 31 containing the material to be cooked is heated by the fire of the burner 2, the heat scatters from the heating point 32 to the pan 31 and is transferred to the material to be cooked in the pan. The material to be cooked is uniformly heated because of the convection.

The temperature sensor 5 detects the temperature at the center of the bottom of the pan which temperature is a mixture of the boiling temperature and scorching preventing temperature. If the material to be cooked has high concentration, the convection proceeds slowly, resulting in a lot of time for the convective heat to reach the center of the bottom of the pan. Furthermore, the thermal conductivity to transfer the heat to the central bottom of the pan 31 is different depending on the material and thickness of the pan (although the temperature difference between a measuring point 34 at the central bottom of a thin aluminum pan having good thermal conductivity and the water is as small as about 2 degrees, the temperature of the measuring point 34 is raised higher if the aluminum pan is thick, since the pan is uniformly heated much faster-due to the heat transfer of the aluminum than the water is substituted by the heat. It is apparent from FIG. 8(A) that the temperature at the bottom of the pan 31, namely, at the measuring point 34 of the pan 31 containing water varies in the range 102°-125° C. depending on the material and thickness of the pan although the water boils at 100° C. FIG. 8(B) shows the temperature at the measuring point 34 when the water (a) boils and when the material (b) to be cooked such as curry or the like boils in the pan of the same material and the same thickness. The temperature difference of about 5 deg is generated.

Figure 8A:
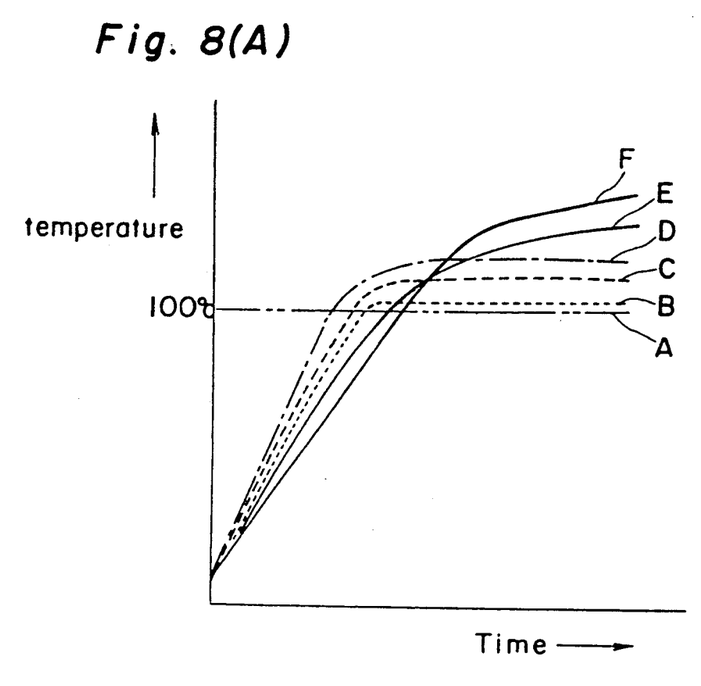
FIG. 8(A) is a graph showing the relationship between the kind of a pan and the temperature at the bottom of the pan during the passage of time.
Figure 8B:
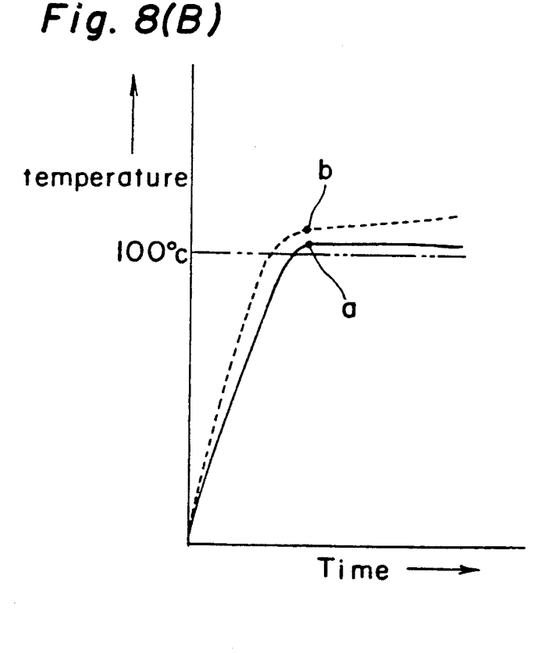
FIG. 8(B) is a graph showing the relationship between the kind of the material to be cooked and the temperature at the bottom of the pan during the passage of time.

In FIG. 8(A), curve A is 100° C. water, curve B is for 102° C. thin aluminum pan, curve C is for 105° C. thick aluminum pan, curve D is for 107° C. enameled pan, curve E is for 115° C. pyrex and curve F is for 125° C. earthen pan.

To provide the boiling detecting temperature region in FIG. 8(A) is to set a limit temperature to decide boiling of the material with clear distinction from oil indicated by a temperature curve F. When the temperature rise of the bottom of the pan is turned into a gentle curve, with the temperature inclination decreased after the water boils, it is decided that the material is boiling. The upper limit temperature is set near 130° C. from the temperature of the measuring point 34 of an earthen pot. It is not good to set the upper limit temperature not lower than 130° C. because the temperature becomes very close to the cooking temperature of fried eggs or material to be sauteed, causing an erroneous detection.

The lower limit temperature in the region is set slightly lower than the boiling point of the water (about 97° C.) in consideration of errors of the components.

If the scorching preventing temperature for the scorching preventing means 26 were set constant according to the material and thickness of the pan 31 or the kind of material to be cooked (referring to FIG. 5), even the same material might be scorched in a different way depending on the using pan. Moreover, the scorching preventing arrangement would be erroneously effected before the material is fully boiled down. As such, the scorching preventing temperature is set corresponding to the temperature of the bottom of the pan when each material boils, thereby keeping the material to be scorched as constantly as possible. Furthermore, since the timer means P28 is provided in the gas cooking apparatus, the gas is not automatically extinguished immediately when the detecting temperature reaches the scorching preventing temperature set for the scorching preventing means 27. The user is permitted to stir the material or add another object, etc. Accordingly, the gas cooking apparatus is convenient to use.

Figure 9:
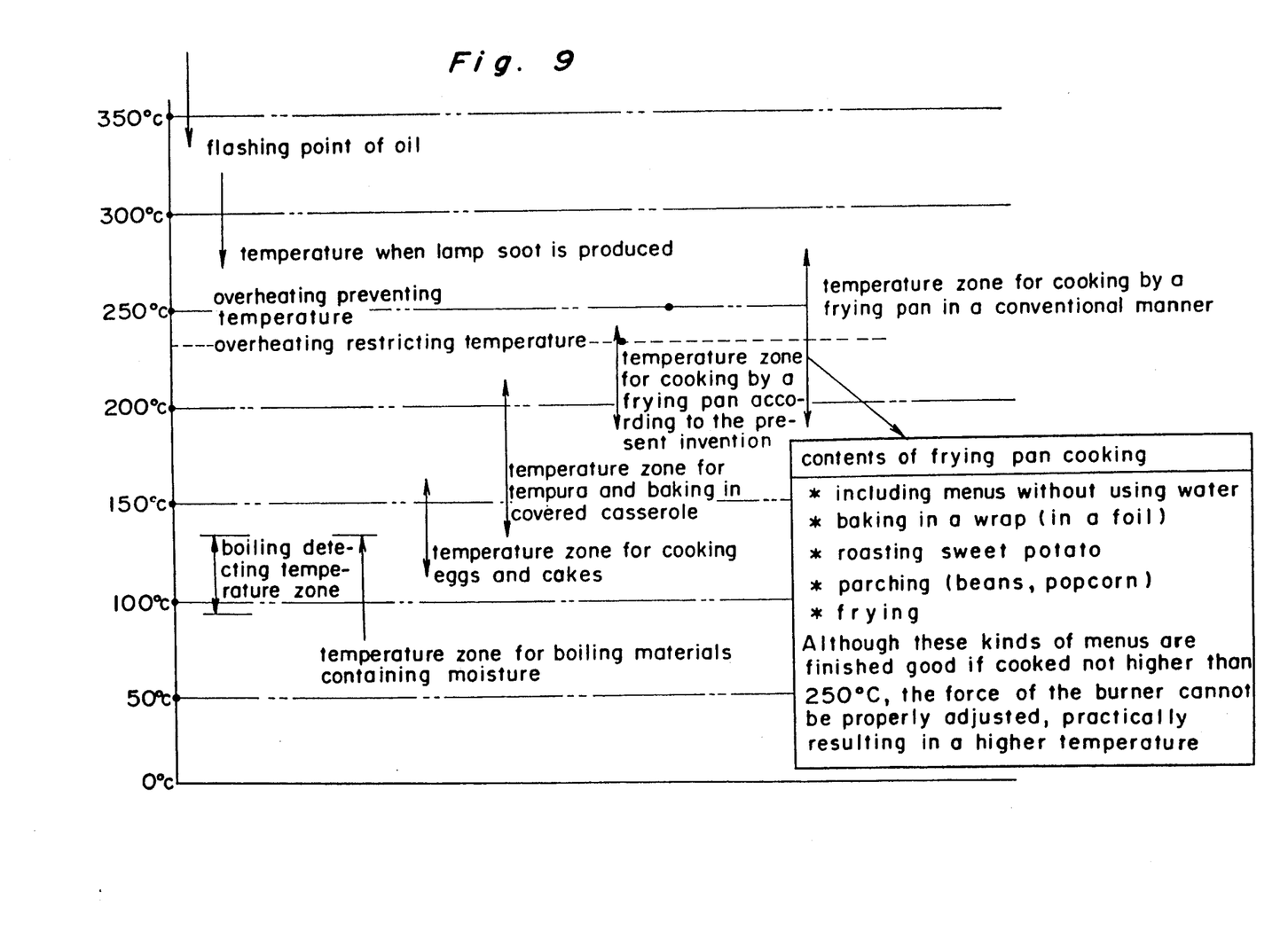
FIG. 9 is a graph showing the temperature distribution in various kinds of menus and the thermal state of oil.

The overheating preventing means 28 shown in FIG. 6 has two stages of temperatures set respectively for preventing overheating (P32) and for restricting overheating (P29), with an aim to solve inconveniences encountered in use of the conventional range with an overheating preventing function. More specifically, with reference to FIG. 9 showing the temperature zone in various kinds of menus, it is clear that as the user adjusts the force of the gas unconsciously according to the menu when using an ordinary range, the cooking temperature by means of a frying pan when beans or small dried, sardines are parched or in making meuniere, roasting beefsteak, etc. is set higher than is necessary for the menu, exceeding the overheating preventing temperature. As a result, the above-mentioned menu cannot be satisfactorily finished by the conventional overheating preventing arrangement since the arrangement is designed to function in an automatic manner during cooking.

In contrast, the overheating preventing means 28 of the present invention has the overheating restricting temperature (P29) set to enable cooking of the above menu not higher than the overheating preventing temperature, namely, 250° C. At the overheating restricting temperature, an alarm is generated (P30) and the heating amount is controlled (P31), so that the temperature of the frying pan does not reach the overheating preventing temperature. In other words, even if the heating amount is restricted when the temperature sensor 5 detects the overheating restricting temperature (P29), since the convection causes an overshoot while heating is restricted, the temperature of the frying pan cannot be immediately lowered. Therefore, it is necessary to determine the overheating restricting temperature and heating amount in consideration of the above overshoot so that the temperature of the frying pan does not become the overheating preventing temperature. Moreover, it is sometimes impossible to maintain the optimum cooking temperature according to the menu if the temperature of the frying pan falls to not higher than the overheating restricting temperature. Accordingly, such an arrangement is made that an alarm is generated when the temperature of the frying pan is decreased a predetermined degree from the overheating restricting temperature thereby to recover the heating amount. In the case where the heating controlling means 24 of the apparatus is not equipped with an automatic adjusting means for adjusting the heating amount, to generate an alarm is useful as a deciding means to manually adjust the force of the fire.

As is described hereinabove, the cooking apparatus of the present invention can achieve the following effects:

(1) The microcomputer incorporated in the cooking apparatus makes it possible to automatically detect whether the material to be cooked contains moisture if only the ignition button is manipulated, without requiring selection of a cooking menu. When the material to be cooked contains moisture, the scorching preventing means is actuated to prevent the material from being scorched. When the material to be cooked does not contain moisture, the overheating preventing means works to avoid an oil fire. Accordingly, the cooking apparatus offers a safety range even a child or an aged person can use.

Since it is not required to select a cooking menu, an inadvertent manipulation can be avoided, and the material to be cooked can be properly treated by the scorching preventing or overheating preventing means.

(2) The moisture detecting means is operated according to such an easy program that detects whether the temperature detected by the temperature detecting means is between the lower limit temperature (e.g., 97° C.) and the upper limit temperature (e.g., 130° C.). Therefore, the microcomputer needs not many areas for RAMs and ROMs. One microcomputer is satisfactory for many burners, so that the cooking apparatus can be manufactured at low cost.

(3) Owing to the simple structure of the moisture detecting means, the cooking apparatus can be used as easily as an ordinary range, free from regulations that the water should not be added before the material to be cooked boils, or the material to be cooked should not be stirred before it boils, etc.

(4) The material to be cooked is detected based on two kinds of information, i.e., the temperature difference between now and 40 seconds before, and the average value of the temperature inclination. Therefore, the material can be clearly distinguished between one to be boiled and one to be sauteed. Although it has conventionally been difficult to distinguish the material to be sauteed, the present invention makes it easy. Moreover, the material to be sauteed is protected from being overheated by the overheating preventing means, and the material to be boiled is protected from being scorched by the scorching preventing means. Optimum control corresponding to the cooking menu is achieved.

(5) Although a mask is set when the material is determined to be fried or sauteed, this mask is released when how to cook the material is decided again. Accordingly, in such menu as curry that is cooked in a a series of cooking, i.e., vegetables are sauteed first and soup or water is added thereto and then boiled, the overheating preventing means works in the first place and, the scorching preventing means functions in the second place.

(6) For the material on the border between boiled and sauteed, conventionally, once it is determined to be sauteed although it requires boiling as well, the scorching preventing function does not act at all. The material may be scorched in the conventional apparatus. According to the present invention, however, how to cook the material is determined again after it has been decided to be sauteed, thereby preventing the material from being scorched.

(7) Since the temperature detected by the moisture detecting means is defined clearly in the boiling detecting temperature region, it becomes possible to detect whether or not the material to be cooked contains much moisture. Besides, the thermal conductivity of the pan containing the material, good or bad, can be detected.

(8) The scorching preventing temperature is set in the definitely-defined temperature region. Therefore, it is prevented that the fire is extinguished earlier than expected. The scorching preventing means is actuated correctly when the water is totally gone. Moreover, it is also prevented that the scorching preventing means delays starting, thereby preventing the material from being burnt down. The accuracy of the scorching preventing means is highly improved.

(9) Since a time lag is preserved between generation of an alarm when the temperature detecting means detects the scorching preventing temperature and automatic extinction of the fire accompanied with automatic reduction of the heating amount, and since the force of the fire is automatically returned to the original level when the temperature detecting means detects not higher than the scorching preventing temperature, the user can re-consider the circumstances and stir or add water.

If the cooking apparatus is out of the reach of the user, it is possible to automatically extinguish the fire after the time lag expires. Scorching is thus prevented. Even when the range is not equipped with an automatic reduction means for automatically reducing the heating amount, the user is able to know the time to manually adjust the force of the fire since an alarm is generated.

(10) If the detecting temperature is not within the upper limit temperature of the moisture detecting means (when no water is present), an alarming means (lamp, buzzer, etc.) is actuated by the overheating preventing means when the detecting temperature reaches the overheating restricting temperature (about 230° C.) before the overheating preventing temperature (about 250° C.) is detected, i.e., the material is in the overheating state, but without a possibility of a fire. As a result, the heating amount is reduced by the heating controlling means so that the temperature of the frying pan coated with fluorocarbon resin is not higher than 250° C. Even if the detecting temperature still exceeds the upper limit temperature, the heating controlling means is actuated to automatically extinguish the fire. Furthermore, if the detecting temperature is reduced to not higher than the overheating restricting temperature by addition of oil, etc., the heating controlling means is actuated by the overheating preventing means to recover the heating amount to the original level. Accordingly, the frying pan coated with fluorocarbon resin (which is resistant to about 300° C. or lower) can be used with ease.

(11) Because of the second preventing temperature set for the overheating preventing means, the temperature of the frying pan is controlled between 230°-250° C. Since most of the menus can be cooked at the temperature not higher than 230°-250° C., it becomes possible to finish the menu so as to look good. This goes true of all the menus using oil, that is, parching, sauteeing, baking, frying, etc. whether or not a frying pan is used. Therefore, almost any kind of menu can be cooked without fail.

(12) Even if the apparatus is not provided with an electromagnetic valve so as to save the cost, since an alarm buzzer is sounded when the temperature of the bottom of the pan reaches the overheating restricting temperature, the adjusting lever can be manually switched in response to the buzzer without using the electromagnetic valve. The conventional drawback that the overheating preventing function is effected too promptly is solved.

Although a gas burner is used as a heating source in the foregoing embodiment, an electric heat generating element may be employed. The foregoing embodiment may be modified in various ways without departing the scope of the present invention.

What is claimed is:

1. An apparatus for controlling heating output of a cooking pan which comprises:
   a heating means for heating said pan containing material to be heated;
   a heating controlling means for controlling the heat generating amount of said heating means;
   a temperature detecting means for detecting the temperature of said pan;
   a detecting means for detecting the type of cooking whether said material is to be boiled or fried based on the temperature change characteristic obtained by said temperature detecting means consequent to heating of said pan by said heating means;
   a scorching preventing means for generating a signal when the temperature obtained by said temperature detecting means is a predetermined number of degrees higher than the boiling temperature of said material when said material is determined to be boiled by said detecting means; and
   a controlling means for controlling the heating output of said heating means in response to said signal of the scorching preventing means.

2. An apparatus for controlling heating output of a cooking pan as claimed in claim 1, further comprising an overheating preventing means for generating a signal when the temperature obtained by said temperature detecting means reaches a predetermined overheating preventing temperature when said material is determined to be fried by said detecting means, thereby controlling the heating output of said heating means by said controlling means in response to said signal from said overheating preventing means.

3. An apparatus for controlling heating output of a cooking pan as claimed in claim 2, further comprising a resetting means for generating a signal when the temperature obtained by said temperature detecting means is reduced to not higher than a predetermined value through cooking manipulations or the like when said material is determined to be fried by said detecting means.

4. An apparatus for controlling heating output of a cooking pan as claimed in claim 1, further comprising an informing means for generating an informing signal in response to a signal from said scorching preventing means.

5. An apparatus for controlling heating output of a cooking pan as claimed in claim 2, further comprising an informing means for generating an alarm in response to a signal from said overheating preventing means.

6. An apparatus for controlling heating output of a cooking pan as claimed in claim 1, wherein the scorching preventing temperature when said scorching preventing means generates a signal is at least two kinds of temperatures corresponding to the viscosity of said material, or the material of said pan.

7. An apparatus for controlling heating output of a cooking pan, which comprises:
   a heating means for heating said pan containing material to be cooked;
   a heating controlling means for controlling the heat generating amount of said heating means;
   a temperature detecting means for detecting the temperature of said pan;
   a detecting means for detecting the type of cooking depending on whether said material is to be fried or boiled based on the temperature change characteristic obtained by said temperature detecting means in the boiling state of water;
   a scorching preventing means which detects that the temperature of said material is raised a predetermined number of degrees higher than that at the start of boiling, with generating a signal, so as to prevent said material from burning onto the pan when the balance between the heating amount and discharging calory subsequent to evaporation of water is lost in the case where said material is to be boiled; and an overheating preventing means which detects that said material reaches an overheating preventing temperature which is a predetermined number of degrees lower than a dangerous temperature having a possibility of a fire when said material is to be fried and in the overheating state;

so that the heat generating amount of said heating means is controlled by said scorching preventing means via said heating controlling means when said material is determined to be boiled by said moisture detecting means, thereby preventing said material from being scorched, while the heat generating amount of said heating means is controlled by said overheating preventing means via said heating controlling means when said material is determined to be fried by said moisture detecting means, thereby preventing said material from being overheated.

8. An apparatus for controlling heating output of a cooking pan as claimed in claim 7, wherein said moisture detecting means detects that said material is to be boiled, with generating a signal, when the temperature inclination detected by a temperature inclination detecting means and showing the change of the temperature with time when said temperature detected by said temperature detecting means is within a boiling detecting temperature region is not higher than a predetermined value, whereas it detects that said material is to be fried, with generating a signal, when the temperature inclination does not become not higher than the predetermined value.

9. An apparatus for controlling heating output of a cooking pan as claimed in claim 7, wherein said overheating preventing means either generates an alarm when the material to be cooked reaches an overheating restricting temperature preset for said overheating preventing means in the overheating state before it reaches an overheating preventing temperature without a possibility of a fire, or controls the heat generating amount of said heating controlling means thereby to decrease the temperature of said temperature detecting means to not higher than the overheating preventing temperature, and wherein said overheating preventing means stops heating via said heating controlling means if the temperature of said temperature detecting means still exceeds the overheating preventing temperature.

10. A method for controlling heating output of a cooking pan by measuring the temperature of said pan heated by a heating means, comprising the steps of:

a determining step wherein the type of cooking of the material to be cooked in said pan, boiling or frying, is determined based on the temperature change characteristic of said pan measured after start of heating; and a heating output controlling step wherein the heating amount of said heating means is controlled when said pan reaches a first predetermined temperature in the event that said material is determined to be boiled in said determining step.

11. A method for controlling heating output of a cooking pan as claimed in claim 10, wherein said heating output controlling step includes a controlling step in which the heating amount of said heating means is controlled when said pan reaches a second predetermined temperature which is higher than said first predetermined temperature in the event that said material is determined to be fried in said determining step.

12. A method for controlling heating output of a cooking pan as claimed in claim 11, further comprising the step wherein the determination that said material is to be fried is dissolved when said pan is reduced to a predetermined temperature due to addition of the other material to be cooked therein after said material has been determined to be fried, whereby the step is returned to said determining step.

13. A method for controlling heating output of a cooking pan as claimed in claim 10, wherein said heating output controlling step includes both controlling the heating amount of said heating means when said pan reaches the first predetermined temperature, and to indicate this fact by an informing means.

14. A method for controlling heating output of a cooking pan as claimed in claim 11, wherein said heating output controlling step includes both controlling the heating amount of said heating means when said pan reaches the second predetermined temperature, and to make an alarm by an informing means.

15. A method for controlling heating output of a cooking pan as claimed in claim 10, wherein said determining step includes a step in which said material is determined to be boiled when a temperature inclination showing the temperature characteristic with time measured after start of heating becomes not larger than a predetermined value while the pan is within a predetermined temperature range from the temperature at the start of boiling of the water therein, or said material is determined to be fried when the temperature inclination does not become not larger than the predetermined value.

16. A method for controlling heating output of a cooking pan as claimed in claim 10, wherein said first predetermined temperature in the heating output controlling step has two different temperatures set for deciding scorching in correspondence to the concentration of said material and material of said pan.

* * * * *